(12) United States Patent
Larson et al.

(10) Patent No.: US 10,018,798 B2
(45) Date of Patent: Jul. 10, 2018

(54) FIBER DROP CABLE ASSEMBLY FOR OUTDOOR AND INDOOR ROUTING

(71) Applicant: Corning Research & Development Corporation, Corning, NY (US)

(72) Inventors: Donald K. Larson, Cedar Park, TX (US); Daniel J. Treadwell, Austin, TX (US); Zachary M. Thompson, Austin, TX (US); William J. Clatanoff, Austin, TX (US); Joseph C. Carls, Austin, TX (US); Victor J. Borer, Austin, TX (US); Cary A. Kipke, Austin, TX (US); Brian M. Cole, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/918,014

(22) Filed: Oct. 20, 2015

(65) Prior Publication Data
US 2016/0116699 A1     Apr. 28, 2016

Related U.S. Application Data

(60) Provisional application No. 62/069,059, filed on Oct. 27, 2014, provisional application No. 62/103,765, filed on Jan. 15, 2015.

(51) Int. Cl.
*G02B 6/44* (2006.01)
*G02B 6/46* (2006.01)

(52) U.S. Cl.
CPC ......... *G02B 6/4466* (2013.01); *G02B 6/4402* (2013.01); *G02B 6/443* (2013.01); *G02B 6/4495* (2013.01); *G02B 6/46* (2013.01); *G02B 6/4433* (2013.01); *G02B 6/4471* (2013.01)

(58) Field of Classification Search
CPC ...... G02B 6/446; G02B 6/4402; G02B 6/443; G02B 6/4495; G02B 6/46; G02B 6/4433; G02B 6/4471; G02B 6/4463
See application file for complete search history.

(56) References Cited

U.S. PATENT DOCUMENTS

| | | |
|---|---|---|
| 3,576,304 A | 4/1971 | Gillemot et al. |
| 6,917,746 B2 | 7/2005 | Simmons et al. |
| 7,394,963 B2 | 7/2008 | Hartlef |

(Continued)

FOREIGN PATENT DOCUMENTS

| | | |
|---|---|---|
| FR | 2568730 A1 | 2/1986 |
| WO | WO 2014/172285 | 10/2014 |
| WO | WO 2015/081511 | 6/2015 |

OTHER PUBLICATIONS

International Search Report for PCT/US2015/056369, dated Jan. 14, 2016, 4 pp.

(Continued)

*Primary Examiner* — John M Bedtelyon
(74) *Attorney, Agent, or Firm* — Gregg Rosenblatt (57) ABSTRACT

Drop cable assemblies that can be routed from an outdoor terminal directly to an indoor wall outlet without disruption, and adhered to the interior of a dwelling after removal of the drop cable jacket and utilization of a pre-applied adhesive layer are described. Additionally, telecommunications systems utilizing such assemblies, methods of routing such assemblies and methods of making such assemblies are described.

17 Claims, 10 Drawing Sheets

(56) References Cited

U.S. PATENT DOCUMENTS

| | | | |
|---|---|---|---|
| 8,107,785 B2* | 1/2012 | Berglund | G02B 6/4441 |
| | | | 174/481 |
| 8,792,766 B2 | 7/2014 | Dickinson et al. | |
| 9,263,870 B2* | 2/2016 | Mann | G02B 6/4466 |
| 2006/0042819 A1 | 3/2006 | Tsukahara et al. | |
| 2008/0187276 A1 | 8/2008 | Roberts et al. | |
| 2009/0294016 A1 | 12/2009 | Sayres et al. | |
| 2012/0066987 A1 | 3/2012 | Malofsky et al. | |
| 2013/0032676 A1 | 2/2013 | Chapman | |
| 2013/0333822 A1 | 12/2013 | Dickinson et al. | |
| 2014/0133808 A1 | 5/2014 | Hill et al. | |
| 2014/0150971 A1 | 6/2014 | Mann | |

OTHER PUBLICATIONS

Search Report for RU Appl. No. 2017112511, dated Apr. 27, 2018, 2 pp.

* cited by examiner

FIBER DROP CABLE ASSEMBLY FOR OUTDOOR AND INDOOR ROUTING

FIELD

The present description relates to a drop cable assembly that can be routed from an outdoor terminal directly to an indoor wall outlet without disruption, telecommunications systems utilizing such assemblies, methods of routing such assemblies and methods of making such assemblies.

BACKGROUND

The deployment of fiber to the home (FTTH) service is occurring at an increasingly rapid pace around the world, as service providers rush to offer greater bandwidth to customers. Installed cost is a significant concern for such service providers. Link loss is the insertion loss of the fiber span between an optical line terminal at a central office and the optical network unit at the subscriber dwelling. Additional connectors or splices are needed at the transition between cable types, and may be necessary when passing from outdoors (i.e. outside of a dwelling) to indoors (i.e. inside of a dwelling). Alternatively, a drop cable can be routed indoors within a conduit for a segment of the length, transitioned to a smaller cable with a splice or connection point, and then routed on the surface of the wall for the remaining segment. Each of these types of terminations adds to link loss, and further adds to the link budget, degrading performance and adding to electronics cost necessary for installation.

It is often necessary to drill large holes to pass a connector end of a pre-terminated drop cable through a dwelling wall. Additionally, appearance of the installed product inside of the dwelling is a key concern for homeowners and landlords. Poorly routed and stapled cables detract from a property's value. The size of the cable which is exposed to the tenant if surface mounted can detract from the décor of the room. Further, installing fiber to the home is a disruption to the homeowner's space. It is critical for an installer to be able to quickly complete an installation with minimal noise, drilling, dust or other intrusions.

The presently described invention addresses all of the concerns discussed above, limiting link loss and budget, avoiding the necessity of large holes to route a drop cable into a dwelling, providing an aesthetically pleasing solution, and minimizing disruption to a homeowner during installation.

SUMMARY

In one aspect, the present description relates to a fiber drop cable assembly. The fiber drop cable assembly includes an optical fiber, an adhesive layer that surrounds the optical fiber, and a removable jacket positioned around the adhesive layer and optical fiber. The adhesive that makes up the adhesive layer is suitable for adhering the optical fiber to a wall or other permanent or semi-permanent structure. In one embodiment, the assembly may further include a buffer coating positioned between the optical fiber and the adhesive layer.

In another aspect, the present description relates to a telecommunications system. The telecommunications system includes a terminal that is positioned exterior to a dwelling, a fiber drop cable that is routed from the terminal, and an unjacketed portion of the fiber drop cable. The fiber drop cable routed from the terminal is jacketed and weatherproofed and is routed to an entrance point of a dwelling through which the cable passes into the interior of the dwelling. The unjacketed portion of the fiber drop cable is routed along an interior surface of the dwelling to a wall outlet. The unjacketed portion includes an adhesive layer that is pre-applied to the fiber drop cable and exposed upon removing the cable jacket. The adhesive layer allows the unjacketed portion of the fiber drop cable to be secured to the interior wall.

In yet another aspect, the present description relates to a method of routing a fiber drop cable directly from a terminal that is external to a dwelling to a wall outlet that is internal to the dwelling. The method includes the steps of: a jacketed optical fiber drop cable to the terminal, routing the jacketed optical fiber drop cable along a portion of an exterior of the dwelling, routing the jacketed optical fiber drop cable through an entrance point into the dwelling, removing the jacket from the jacketed optical fiber drop cable, exposing an optical fiber and an adhesive layer, adhering the optical fiber layer to the interior wall of the dwelling utilizing the adhesive layer, and connecting the optical fiber to the wall outlet.

In another aspect, the present description relates to a method of making a fiber optic cable assembly. The method includes the steps of: providing a jacketed cable with a hollowed interior, opening a re-sealable groove in the jacket to expose the hollow interior, inserting into the hollowed interior of the jacket an optical fiber, the optical fiber being surrounded by an adhesive layer that suitable for adhering the optical fiber to a wall or other permanent or semi-permanent structure, and re-sealing the groove in the jacket to enclose the buffer coated optical fiber. In one aspect, the optical fiber inserted into the hollowed interior jacket may be a buffer coated optical fiber.

In yet another aspect, the present description relates to a telecommunications system. The telecommunications system includes a terminal that is positioned exterior to a dwelling, a fiber drop cable that is routed from the terminal, and an unjacketed portion of the fiber drop cable. The fiber drop cable routed from the terminal is jacketed and weatherproofed and is routed to an entrance point of a dwelling through which the cable passes into the interior of the dwelling. The unjacketed portion of the fiber drop cable is routed along an interior surface of the dwelling to a wall outlet. The unjacketed portion is inserted into a track that is adhered to the interior wall of the dwelling and routed to the wall outlet. Additionally, the track includes features positioned along the length of the track that act to define a channel for securing and protecting the unjacketed portion of the fiber drop cable.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on," "connected to," "coupled with," "stacked on" or "in contact with" another element, component or layer, it can be directly on, directly connected to, directly coupled with, directly stacked on, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

The terms "buffered" optical fiber and "buffer coated" optical fiber may be used interchangeably throughout the description.

Figure 1A:
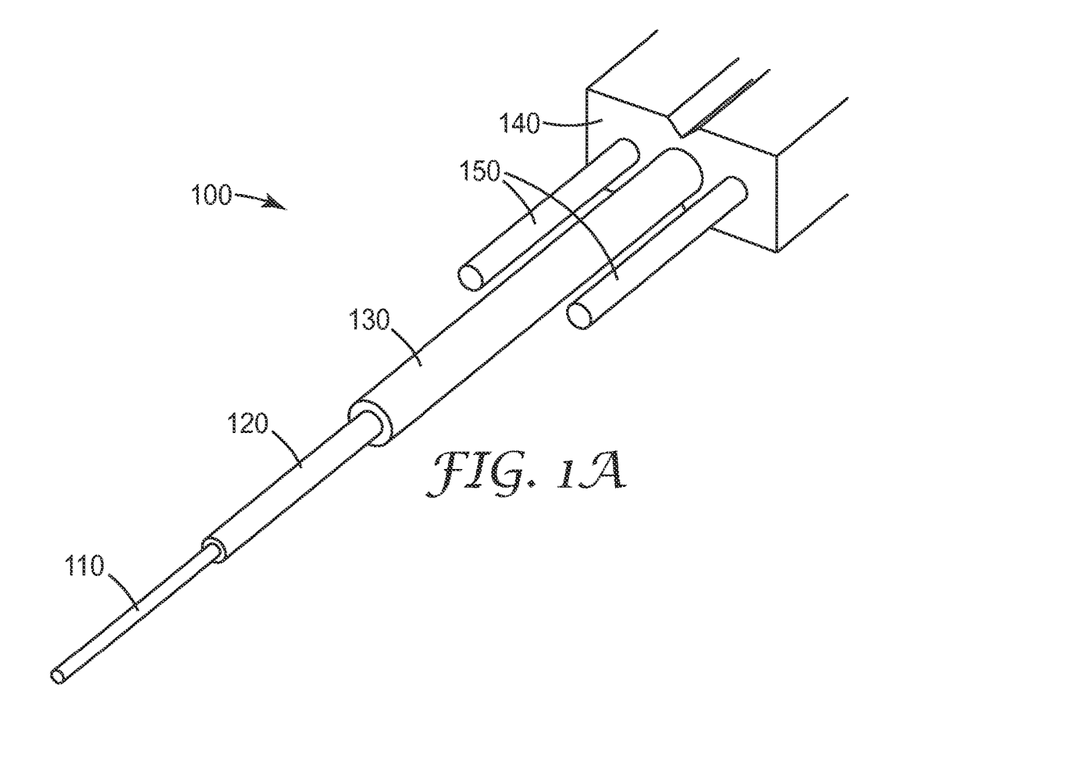
FIGS. 1A-1C provide different views of a fiber drop cable assembly according to the present description.
Figure 1B:
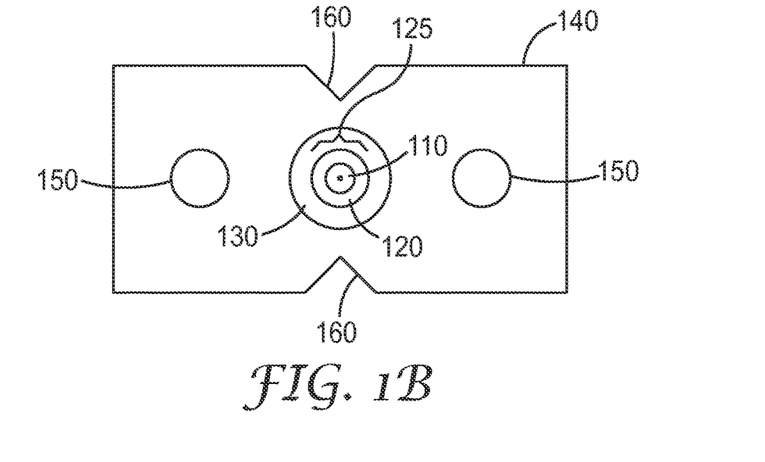
Figure 1C:
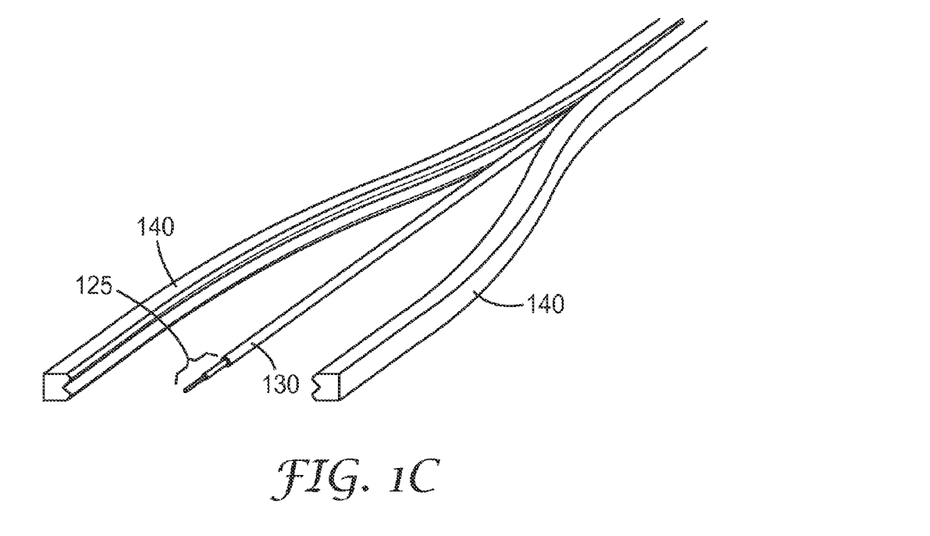

FIGS. 1A-1C provide different views of a fiber drop cable assembly 100 according to the present description. Fiber drop cable assembly includes an optical fiber 110. Optical fiber 110 may be a conventional optical fiber having a conventional diameter of approximately 250 microns. The optical fiber is generally a standard optical fiber with a glass optically transmissive portion having a diameter of approximately 125 microns, and an acrylate coating surrounding the glass, the acrylate coating having a thickness of approximately 62.5 microns, such that the diameter of the entire "optical fiber" is 250 microns. Assembly 100 may further include a buffer coating 120 that surrounds the optical fiber 110. The diameter of the buffer coated optical fiber (labeled as element 125), which takes into account both the optical fiber and the buffer layer, may in some embodiments be between 250 (nominal) and 700 microns, or between 450 and 550 microns, or potentially between 490 and 510 microns, or between 550 microns and 650 microns, or potentially between 590 and 610 microns. In another embodiment, the diameter of the buffer coated optical fiber may be between 800 and 1000 microns, or between 850 microns and 950 microns, or potentially between 890 and 910 microns. However, although not shown in the figures, in some embodiments, there will be no buffer coating around the optical fiber.

Fiber drop cable assembly 100 further includes an adhesive layer 130 that may surround the buffer coating. The adhesive making up adhesive layer 130 is suitable for adhering the buffer coated optical fiber 125 to a wall or other permanent or semi-permanent structure. In embodiments, where the optical fiber does not include a buffer coating around it, the adhesive layer 130 will directly surround the optical fiber 110. In one embodiment, the adhesive of adhesive layer 130 can be a pressure sensitive adhesive. In another embodiment, the adhesive layer 130 may contain a heat activated adhesive. The adhesive layer 130 may contain adhesives that are cured by moisture, radiation, or are simply air cured. Where a pressure sensitive adhesive is used, the pressure sensitive adhesive may be of a rubber, acrylic or silicone class adhesive. Appropriate rubber class pressure sensitive adhesives can include, e.g., natural rubber, synthetic polyisoprene, a styrene/butadiene random copolymer, polybutadiene, or SIS and SBS block copolymers.

Appropriate silicone class pressure sensitive adhesives can include, e.g., traditional solvent silicone systems or silicone polyurea (SPU). Appropriate resin class pressure sensitive adhesives can include copolymers of acrylic monomers combining 1) a low Tg component, 2) a polar monomer, and optionally 3) a high TG component. One specific appropriate resin class pressure sensitive adhesive is 3M™ Low Surface Energy Acrylic Adhesive 300LSE from 3M Company (St. Paul, Minn.). Appropriate methods for coating the adhesive onto the buffered optical fiber may include solvent based coating methods, water based coating methods, polymerized web-coating, or hot melt extrusion.

The assembly 100 also includes a removable jacket 140 that is positioned around the adhesive layer 130 and buffer coated optical fiber 125 (where a buffer coating is present). FIG. 1C clearly illustrates jacket 140 in the process of being removed from the buffer coated optical fiber 125 (or fiber 110) and adhesive 130. The jacket may be capable of being removed by using a tool, or in another embodiment, may be peeled by hand. In some embodiments, the removable jacket 140 may be formed from a polymer material, such as polyethylene. Other materials may also be suitable materials for the primary jacket, such as polypropylene, polyvinyl chloride (PVC), TPE, neoprene, polyurethane or fluoropolymers such as FEP and PFA. Jacket may, in one preferred embodiment, be both durable and weatherable. As such, one particularly appropriate material for jacket 140 may be UV stabilized polyethylene material. In some embodiments, the jacket 140 may also be abrasion resistant. The jacketed fiber is intended to be ruggedized for potential exposure to the elements, and is often times conspicuously colored black. These properties create negative visual impact if the jacketed cable is routed with the jacket on into a dwelling. Thus, the desirability of removing the jacket upon entry into the dwelling. In one embodiment, the jacket may be coated with a low friction fluorochemical coating, such as described in commonly owned and assigned International Publication No. WO 2015/081511, so that it can easily be pulled through the entry point into the dwelling.

To aid in removing the jacket 140, the jacket may include at least one indentation 160 (or potentially multiple indentations) as illustrated in FIG. 1B. The indentation(s) 160 are positioned proximate the buffer coated optical fiber 125 and run along the cable assembly's axis, allowing for the jacket to be removed more easily and consistently expose the fiber along its length upon removal (as illustrated in FIG. 1C). Alternatively, the fiber drop cable assembly may include a pull string that is positioned within the jacket and runs parallel to the optical fiber. The pull string may be used to open the jacket when pulled by a user. Such a construction is illustrated in the embodiment described further below and illustrated in FIG. 7.

As further illustrated in FIGS. 1A and 1B, assembly 100 may also include two strength members 150 that are positioned within the removable jacket 140 on opposite sides of optical fiber 110. In some embodiments, the strength member 150 may be polymer rods. The polymer rods may be solely polymer, or may be glass reinforced polymer rods, carbon fiber reinforced polymer rods, or polyaramide (e.g., products sold under the trade designation KEVLAR) reinforced polymer rods.

Figure 2:
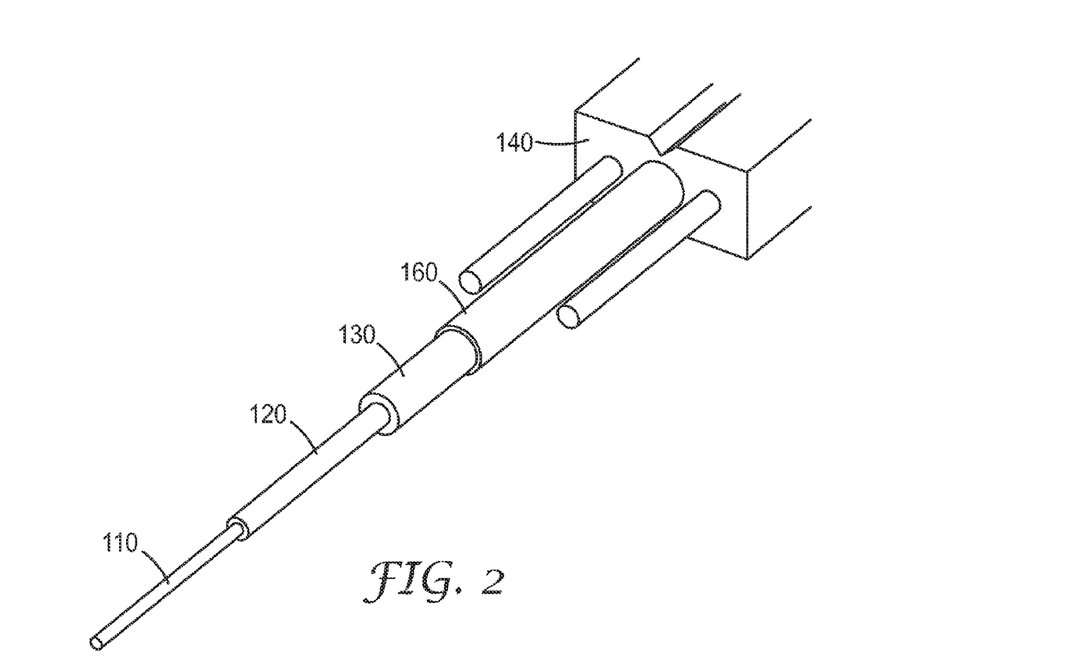
FIG. 2 provides a perspective view a fiber drop cable assembly according to the present description.

In another embodiment, illustrated in FIG. 2, a fiber drop cable assembly 200 may resemble that of drop cable assembly 100, with one addition. Drop cable assembly 200 may additionally include a liner layer 160 that is positioned over the adhesive layer 130 and within the jacket 140. The liner 160 is capable of remaining intact after the jacket 140 has been removed. Liner 160 may subsequently (after removal of the jacket) be separated from the adhesive layer to prepare the adhesive layer for adherence to a surface, as further discussed below.

Figure 3:
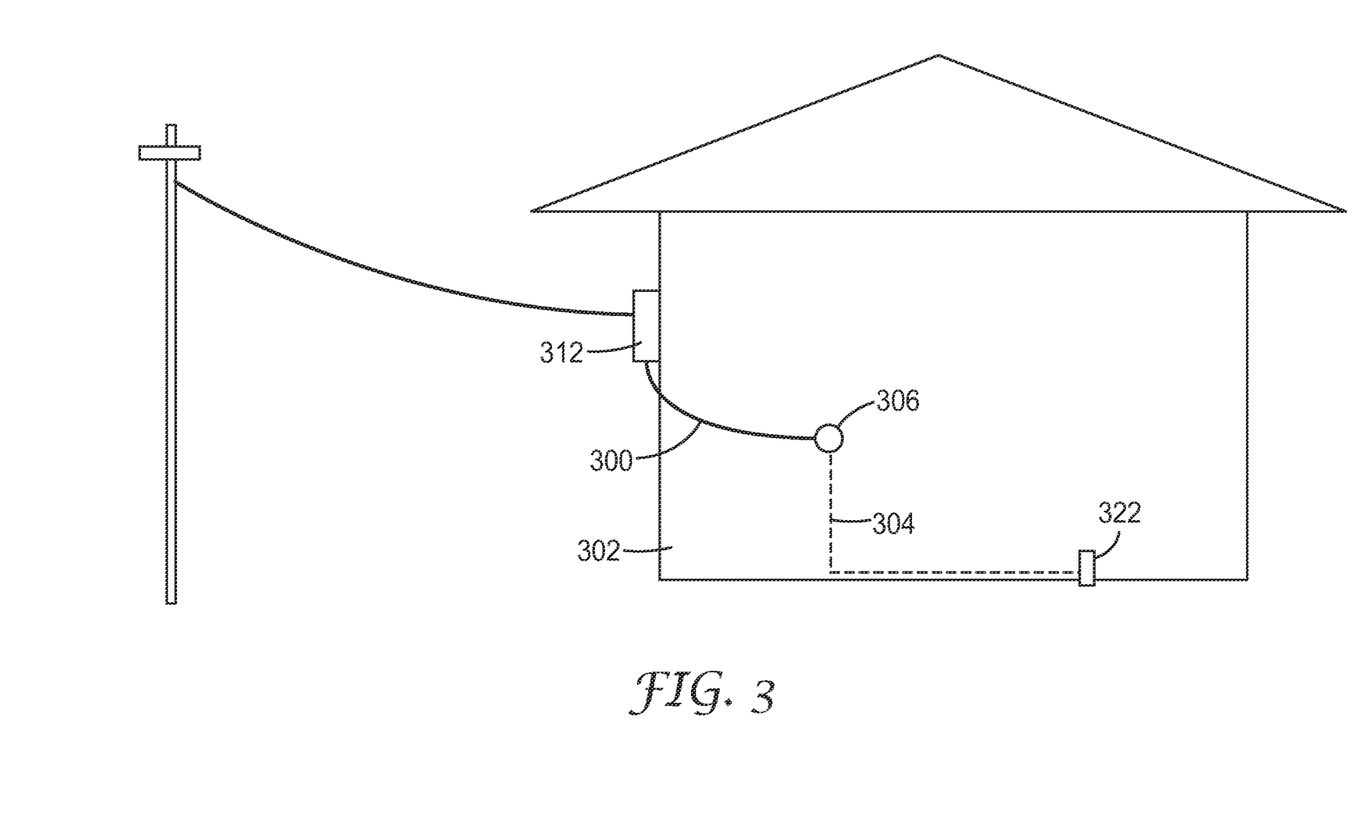
FIG. 3 provides an exterior diagram of a telecommunications system according to the present description using fiber drop cable assemblies.
Figure 9:
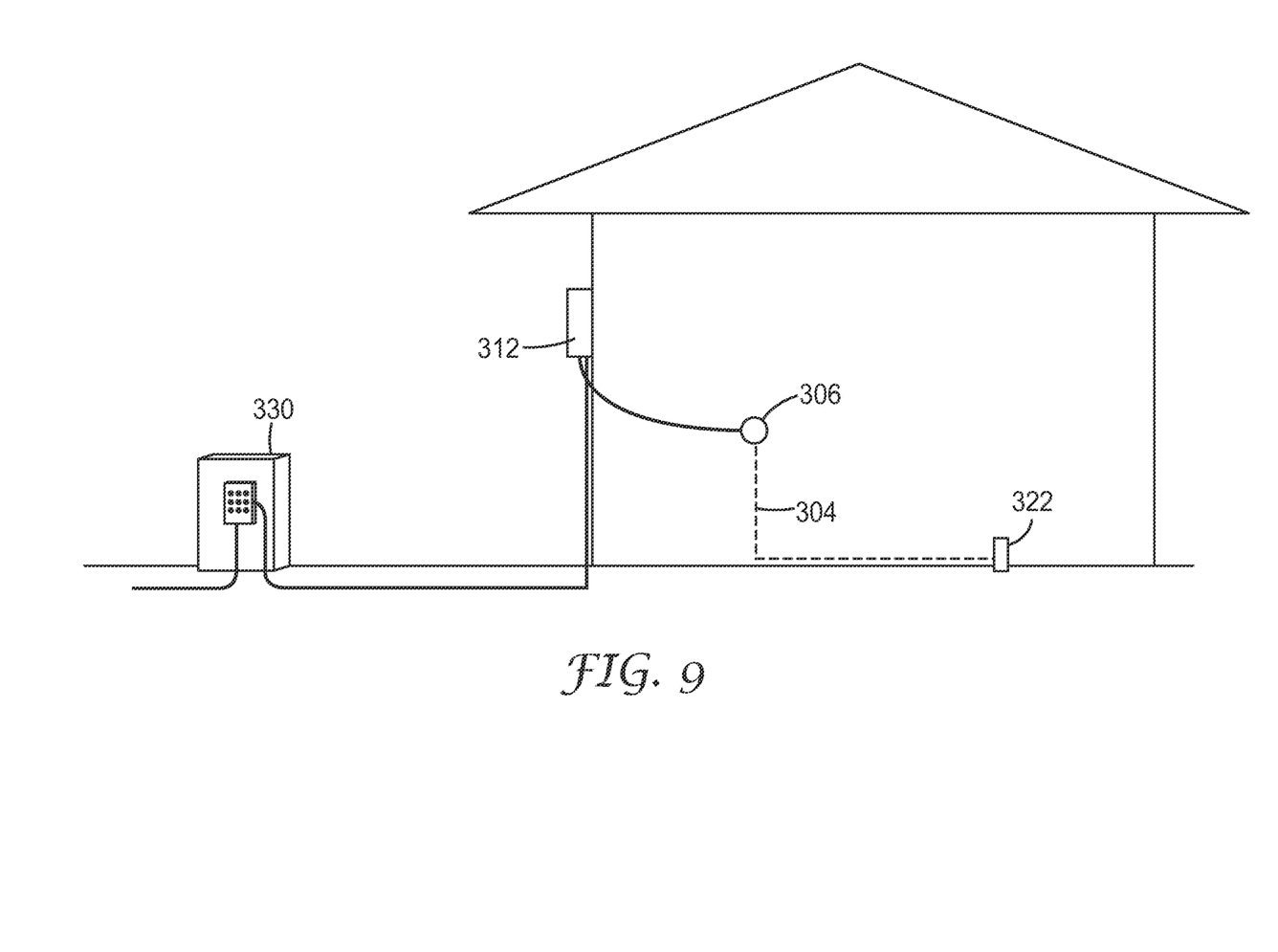
FIG. 9 provides an exterior diagram of a telecommunications system according to the present description using fiber drop cable assemblies.

In one appropriate use, as illustrated in FIG. 3, the fiber drop cable assembly of the present description, entirely jacketed, is routed exterior to a dwelling 302. The drop cable assembly may be attached to the exterior wall of the dwelling using a number of conventional means, including stapling, cable clamps, or routing within conduits. Upon entry into the building through an entrance point 306, a peeled portion of the cable assembly 304 is adhered to a surface (e.g.) a wall of the interior of the dwelling 302. The peeled portion 304 may correspond to adhesive coated buffered fiber (elements 140 and 125), or simply adhesive coated optical fiber. As noted, the adhesive coated buffer coated fiber (or adhesive coated fiber) may be adhered to a wall, or other permanent or semi-permanent structure or surface. However, it may also be desirable to ensure that the portion of the adhesive coated fiber not in contact with the wall does not remain tacky after installation. As such an installer may use any number of means to render tack-free the non-adhered portions of the adhesive layer, such as i) placing a thin particulate layer on and covering the adhesive layer, ii) placing a thin film on and covering the adhesive layer, iii) applying a coating to and covering the adhesive layer, iv) including a volatile tackifying agent in the adhesive layer that evaporates and renders the adhesive tack-free, or, v) utilizing a curing reaction based on light, heat, moisture or air that causes the adhesive to slowly lose tack. FIG. 3 shows an aerial deployment from pole to the house. This could also be a buried application where the fiber is fed underground when routing towards the dwelling. FIG. 9 illustrates one such example, where a drop cable is routed underground from terminal 312 (in this embodiment, potentially a network interface device) to another distribution terminal 330. Alternatively, though not shown, the cable may be routed directly from the building entrance point 306 underground and routed directly to terminal 330.

Figure 10:
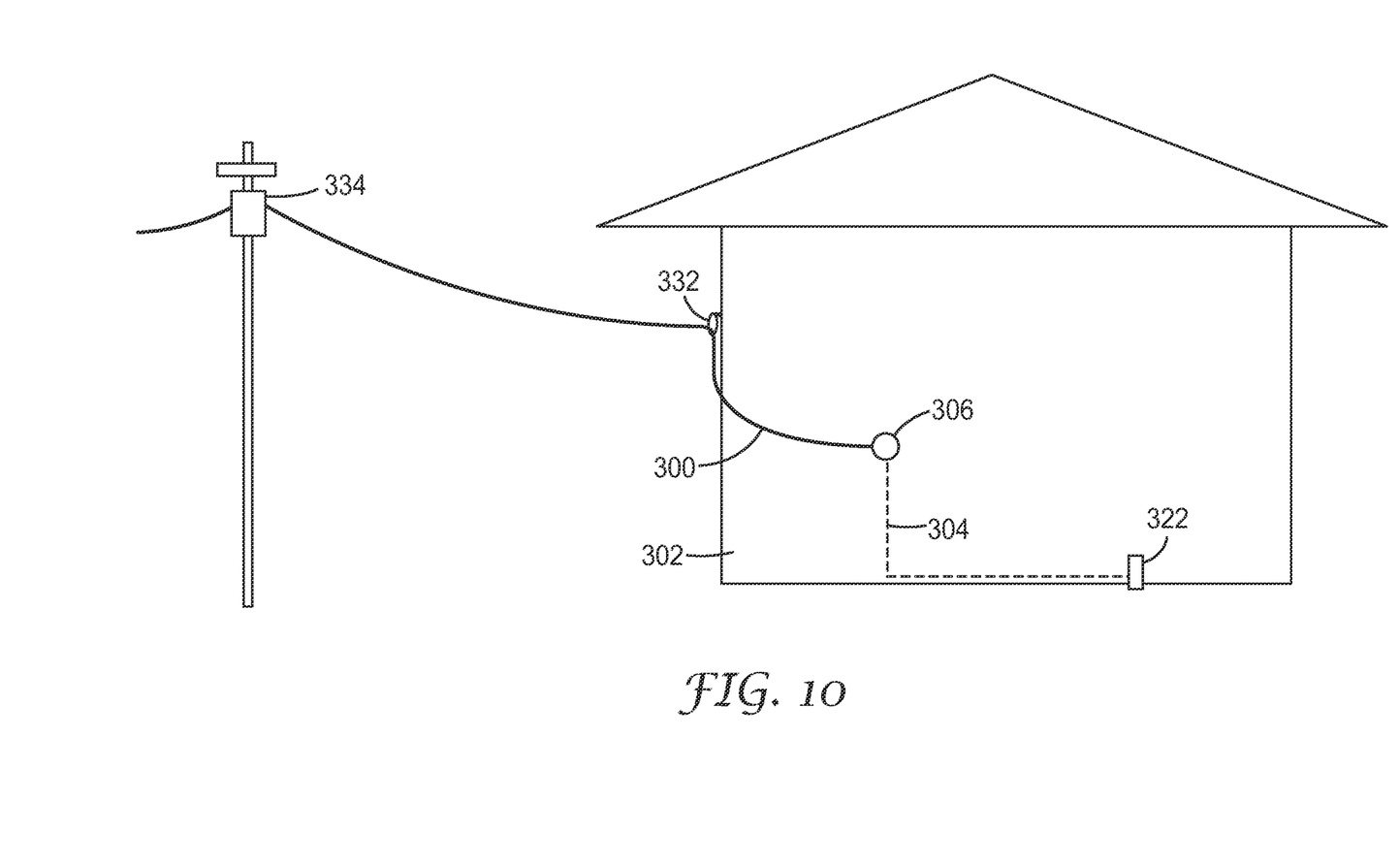
FIG. 10 provides an exterior diagram of a telecommunications system according to the present description using fiber drop cable assemblies.

FIG. 10 offers another example of routing of the jacketed weather fiber drop cable assembly outside of the dwelling. In this particular embodiment, rather than being routed to the building entrance point 306 from a network interface-type device mounted on the exterior of the dwelling, the jacketed fiber drop cable assembly is routed directly to a terminal 334 that is positioned on a light pole. In such an embodiment, the system may include a strain relief device 332 positioned on the exterior of the dwelling.

Figure 4:
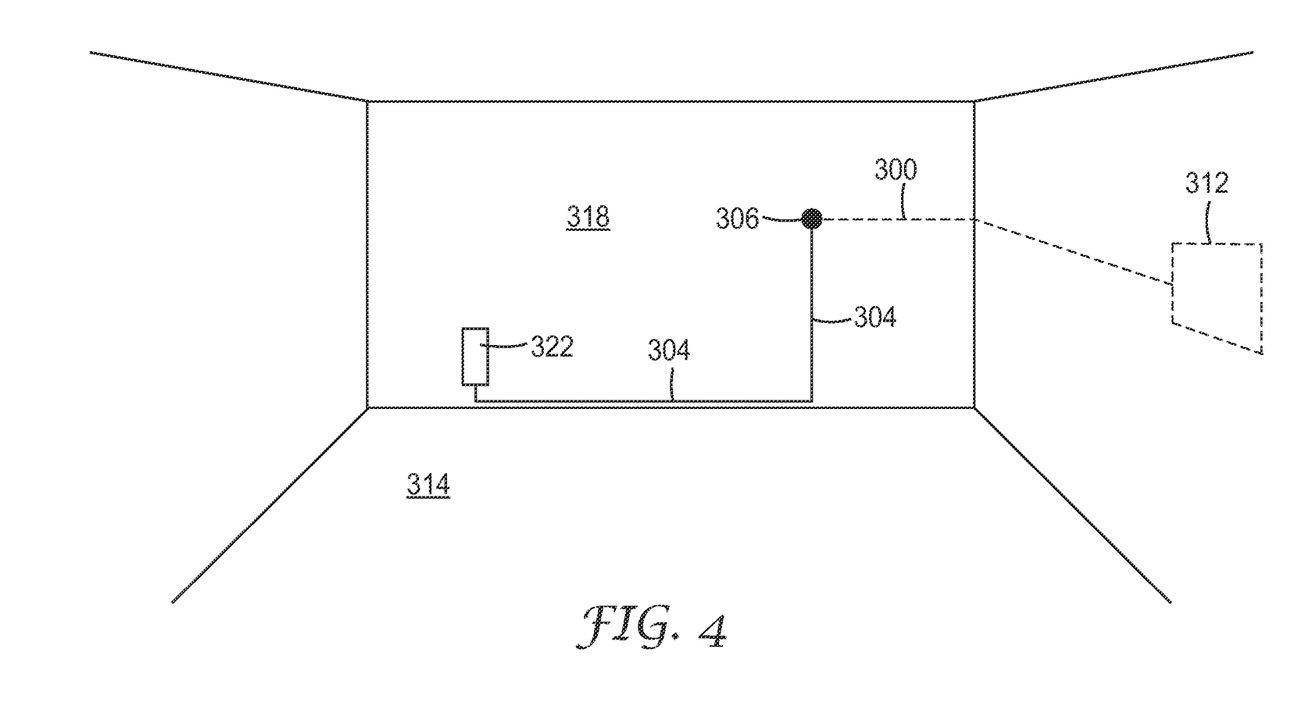
FIG. 4 provides an interior diagram of a telecommunications system according to the present description using fiber drop cable assemblies.

FIG. 4 provides an interior view of the system also illustrated in FIG. 3. These figures may be used together to understand discussion of the telecommunications system below. One telecommunications system according to the present description includes a terminal 312 that is positioned external to a dwelling 302. Terminal 312 may, e.g., be what is understood as a network interface device. A fiber drop cable 300, such as the fiber drop cable assemblies 100 and 200 discussed above, is routed from the terminal 312. The drop cable 300 is jacketed and weatherproofed and is routed to an entrance point 306 of the dwelling through which the fiber passes into the interior of the dwelling 314. At this point, an unjacketed portion of the fiber drop cable 304 is routed along an interior surface 318 of the dwelling to a wall outlet 322. As used herein, the term "wall outlet" may be understood to include conventional wall outlets, wall mounted customer premises equipment devices (CPE devices) and other O/E devices. The unjacketed portion of the drop cable includes an adhesive layer (see, e.g., adhesive layer 140 in FIG. 1) that is applied to the fiber drop cable and exposed upon removing the cable jacket (see FIG. 1C), the adhesive layer allowing the unjacketed portion of the fiber drop cable to be secured to the interior wall 318. Of particular importance in the system described in FIGS. 3 and 4, is that the fiber drop cable, including both the portions external to the dwelling 302 and the unjacketed portions in the interior of dwelling 314, is continuous between the wall outlet 322 and terminal 312 without any need for termination or connection of the optical fiber at any point in between these two points (including at entrance 306).

In a different aspect, the dwelling may be part of a multi-dwelling unit, such that exterior of dwelling 302 is in fact a hallway of a multi-dwelling unit (not shown). In such an embodiment, it is possible that the system will include a jacketed fiber drop cable that is routed within a raceway or a conduit from a terminal or building entrance point to a living unit. Upon entering the living unit the rugged jacket is removed to expose a buffered fiber which is surrounded by an adhesive layer with is utilized to adhere the fiber to the interior wall of the living unit and connecting the optical fiber to the wall outlet. Alternatively, in either aspect, the jacket of the cable may not be removed upon entry into the dwelling, but may be removed only after being routed a given distance within the dwelling. Such an article (or method of routing in accordance with the methods described below) may be appropriate where an entry point is in a place that is not generally visible to inhabitants at most times, e.g., in a closet. In such a system or method, the jacket may be removed when the cable enters a more highly visible region of the dwelling.

FIGS. 3 and 4 can also be used to provide an illustration of a method of routing a fiber drop cable directly from a terminal that is external to a dwelling to a wall outlet that is internal to the dwelling. The method includes the step of connecting a jacketed optical fiber drop cable 300 to a terminal 312 and routing the jacketed optical fiber drop cable along a portion of an exterior of the dwelling 302. The method further includes the step of routing the jacketed optical fiber drop cable 300 through an entrance point 306 in the dwelling. Entrance point 306 can be of a diameter that is only slightly larger than the jacketed optical fiber drop cable. It is important to note that the current construction offers a major improvement over conventional systems that place a box at the entrance to the dwelling, and connect a separate indoor cable and outdoor cable within the box.

Next, the jacket of the cable portion that is inside of the dwelling is removed from the cable (in a similar manner to that shown in FIG. 1C), exposing an optical fiber that may be surrounded with a buffer layer, and an adhesive layer that surrounds the buffer layer (or surrounds the optical fiber where no buffer layer is present). In one embodiment, the jacket may be capable of being removed by hand. The optical fiber layer (unjacketed and potentially buffer coated) 304 is adhered to an interior surface 318 of the dwelling utilizing the adhesive layer. After routing along the interior wall, the optical fiber is connected to the wall outlet 322. In one embodiment, the steps described immediately above are performed sequentially. Alternatively, the distance along which the optical fiber must be routed may be measured and then removed to provide for the appropriate amount of unjacketed fiber first, and the drop cable is connected to the wall outlet before being routed outside to the terminal external to the dwelling.

Although the adhesive layer is critical to adhere the optical fiber, it will be clear to one of skill in the art that it is undesirable for the surface area of the buffered or unbuffered optical fiber that is not adhered to the wall to retain its tackiness. Exposed tacky portions of the fiber can result in accumulation of dust, and may cause issues with any slack portions of the fiber that are wound, e.g., at the wall outlet. Accordingly, one further step of the method herein described is to cause the non-adhered adhesive to become tack-free. As described above, this "detackification" of the buffered optical fiber may be achieved through a number of means, including, i) a thin particulate layer being placed on and covering the adhesive layer, ii) a thin film being placed on and covering the adhesive layer, iii) a coating being applied to and covering the adhesive layer, iv) a volatile tackifying agent dissolved in the adhesive that evaporates and renders the adhesive tack-free, or v) a curing reaction based on light, heat, moisture or air that causes the adhesive to lose tack.

Figure 8:
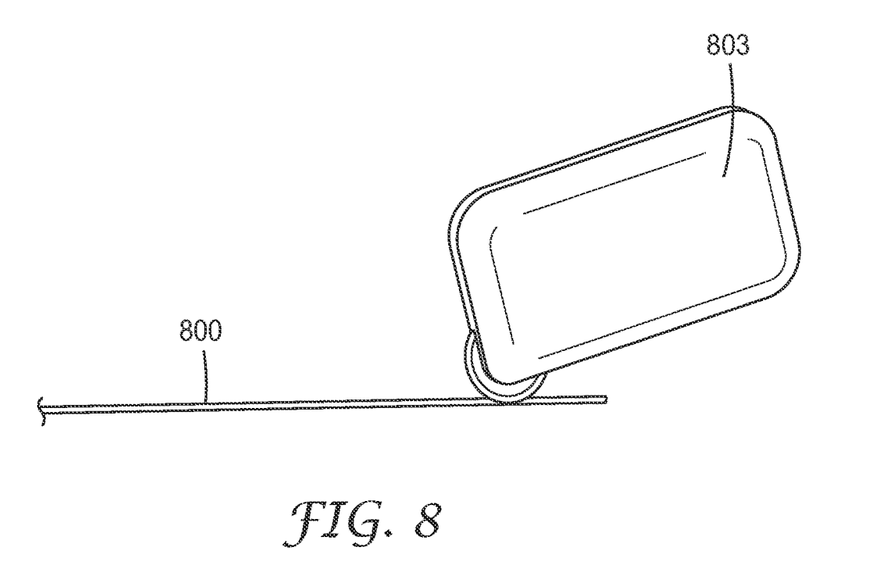
FIG. 8 illustrates an applicator tool for applying a fiber drop cable assembly to a surface.

The unjacketed optical fiber with adhesive layer may be adhered to the wall or other surface by appropriate means. In one embodiment, the adhesive layer may be adhered to the interior surface 318 of the dwelling using an applicator tool. The applicator tool may apply pressure to the optical fiber when being used, resulting in a deformation of the adhesive layer, and a greater surface area of adhesive on the interior surface. One example of such an applicator tool in the process of applying an unjacketed buffer optical fiber to the interior surface of a dwelling is illustrated in FIG. 8 with applicator tool 803 applying optical fiber 800 to a surface. The applicator tool may also be used to implement some of the detackification techniques described above, such that exposed surface portions of the optical fiber are no longer tacky after contact with the applicator tool.

Figures 5, 6A:
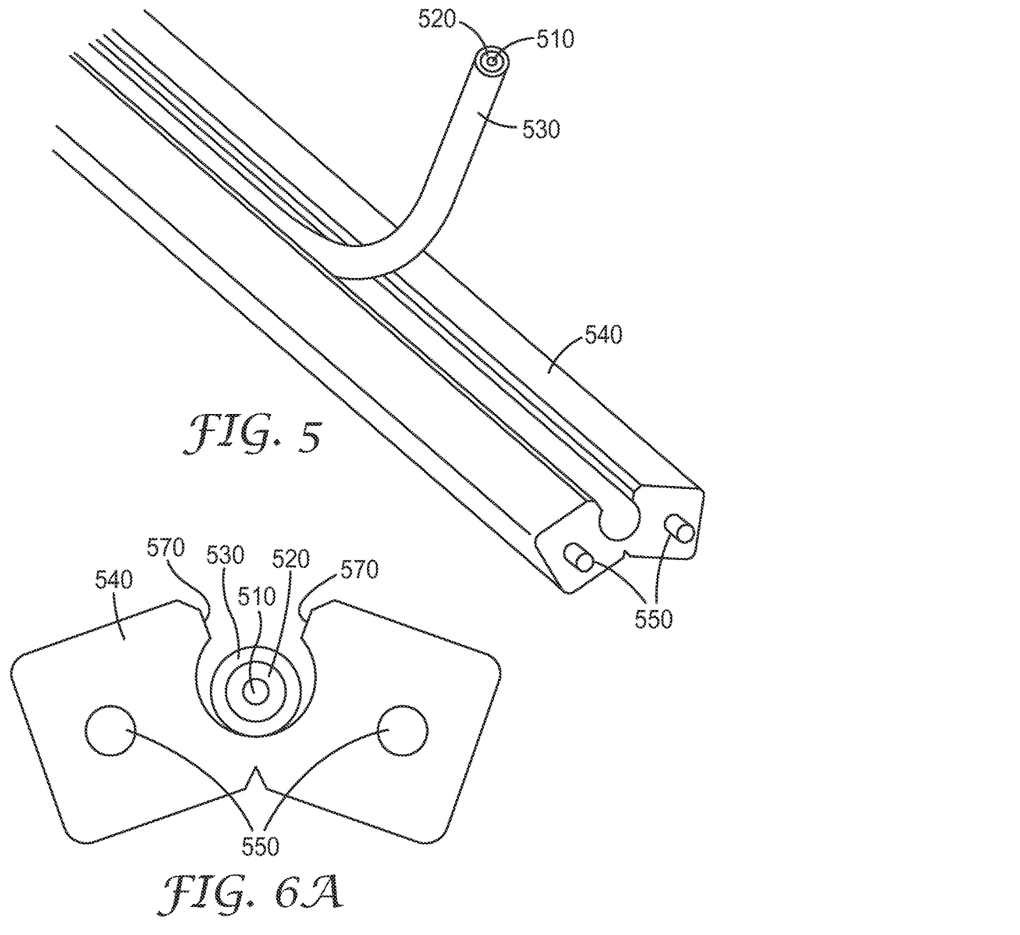
FIG. 5 provides a perspective view of a fiber drop cable assembly according to the present description.
FIGS. 6A-6B provide cross-sectional views of a fiber drop cable assembly according to the present description.

FIG. 5 provides yet another version of a fiber drop cable assembly according to the present description. In the illustrated embodiment, again the fiber drop cable assembly includes an optical fiber 510, with buffer coating 520 surrounding the optical fiber and an adhesive layer 530 that surround the buffer coating, the adhesive suitable for adhering the buffer coated optical fiber to a wall or other permanent or semi-permanent structure. Additionally, the assembly of FIG. 5 includes a removable jacket 540 positioned around the adhesive layer and buffer coated optical fiber. FIG. 5 illustrates jacket 540 in the process of being removed from around these elements.

Figure 6B:
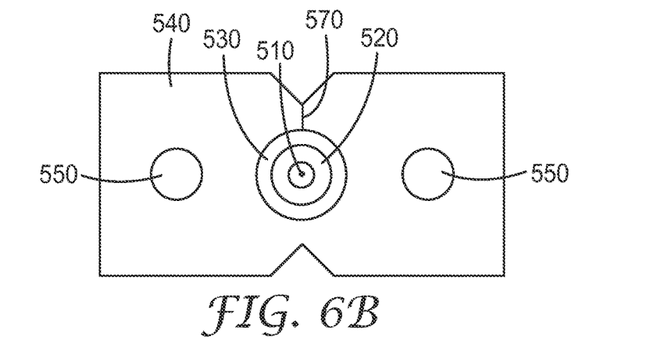

FIG. 5, and also FIGS. 6A and 6B which show the same construction from a cross-sectional view in both an open and closed jacket positions (respectively), illustrate this additional embodiment. The assembly offers other characteristics that may differ from assemblies described above.

The present description also relates to a method of making a fiber drop cable assembly. The most common method of assembling a cable construction, including FRP-type cable, is to extrude the jacket portion of the cable around the optical fiber, and strength members (if any) in a continuous process. As an alternative, one may begin the process with a jacketed cable that does not yet contain optical fiber. The jacketed cable may contain strength members (e.g. strength member 550 in FIGS. 5 and 6A-6B). However, the central portion of the cable may be hollow. The hollowed jacket 540 may be capable of being opened (as illustrated in FIGS. 5 and 6A), and an optical fiber 510, potentially surrounded by a buffer layer 520, and adhesive layer 530 surrounding the optical fiber (and buffer layer where present) may be laid into the hollowed out center. After the adhesive coated optical fiber has been laid in the jacket 540, the jacket may be closed and re-sealed at groove area 570. The jacket may be sealed by appropriate method. In one embodiment, the groove area 570 may be heated such that the jacket seals by melting at groove area 570. In another embodiment, the adhesive layer 530 may act to sufficiently adhere the jacket 540 around the construction such that it remains closed at groove area 570. However, the adhesive layer will generally have a stronger adhesion to the optical fiber and will release freely from the jacket when the user applies an opening or peeling force to the jacket. The re-sealed cable construction will resemble that shown in FIG. 6B. When and if a portion of the cable is intended for routing along an interior surface of a dwelling, it may once again be opened by removing the appropriate amount of jacket, and adhering the buffer coated optical fiber to the surface.

Figure 7:
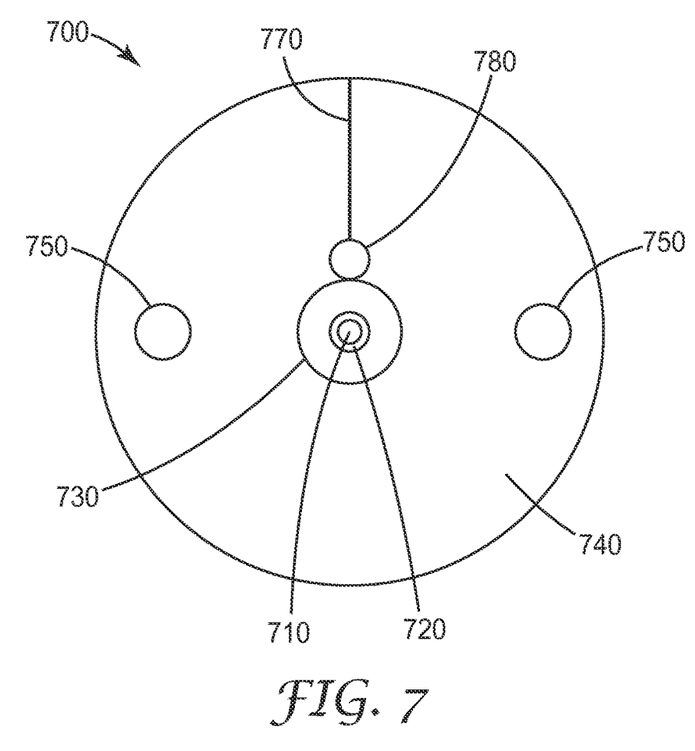
FIG. 7 provides a cross-sectional view of a fiber drop cable assembly according to the present description.

FIG. 7 illustrates yet another cross-sectional view of a potential fiber drop cable assembly 700 according to the present description. Here, as opposed to the other constructions shown, and as contemplated in the present description, the construction is a rounded cable with a generally round jacket 740. In previous embodiments, a generally rectangular jacket (also contemplated) is described, and any other number of jacket cross-sectional shapes may be appropriate. As with the other assemblies the construction may include an optical fiber 710, a buffer coating surrounding the optical fiber 720, an adhesive layer 730 surrounding the buffer coating, the adhesive suitable for adhering the buffer coated optical fiber to a wall or other permanent or semi-permanent structure; and a removable jacket 740 positioned around the adhesive layer and buffer coated optical fiber. The construction may additionally include strength member 750 similar to those described in earlier embodiments. As with the construction shown in FIG. 6, assembly 700 may include a groove area 770 that may or may not be resealable. Additionally, in this construction, the assembly 700 further includes a pull string 780. The pull string 780 is positioned within the jacket 740 and runs generally parallel to the optical fiber. A portion of the pull string may be exposed either manually or left exposed during manufacture, such that the jacket may be opened and removed by an installer by simply pulling the pull string.

In yet another alternative embodiment, a fiber drop cable assembly may include multiple optical fibers, e.g., 4 optical fibers, 8 optical fibers, 12 optical fibers, or any other appropriate number of fibers. The optical fibers may be closely bundled and the bundle of optical fibers may be surrounded by a singular buffer coating or tubing. As with the other single fiber constructions, an adhesive layer may be applied that surrounds the buffer coating/tubing, the adhesive suitable for adhering the buffer coated optical fiber to a wall or other permanent or semi-permanent structure. Additionally, a removable jacket may be positioned around the adhesive layer and buffer coated optical fiber. Such a construction may be suitable for bringing multiple fibers to a location, e.g., to run to a consolidation, terminal or outlet and drop service to multiple tenants or business customers. In yet another embodiment, the present description relates to a telecommunications system in which no adhesive layer is pre-applied to the portion of the assembly within the jacket. As with the system in FIGS. 3 and 4, the telecommunications system includes a terminal 312 that is exterior to a dwelling, and continuous fiber drop cable routed from the terminal 312, the fiber drop cable 300 being jacketed and weatherproofed and being routed to an entrance point 306 of a dwelling through which the fiber drop cable passes into the interior of the dwelling. Again, in the system, an unjacketed portion of the fiber drop cable is routed along an interior surface of the dwelling to a wall outlet. However, in the current embodiment, the unjacketed portion of the fiber drop cable (e.g., the buffer coated optical fiber) is inserted into a track that is adhered to the interior wall of the dwelling and routed to the wall outlet 322. The track includes features positioned along the length of the track that act to define a channel for securing and protecting the unjacketed portion of the fiber drop cable. The track may be routed all the way from the entrance point to the dwelling to the wall outlet. Alternatively, the track may be routed only part of the distance to the wall outlet, e.g., where the entrance point to the dwelling is at a point that is generally not visible to inhabitants.

Figure 11A:
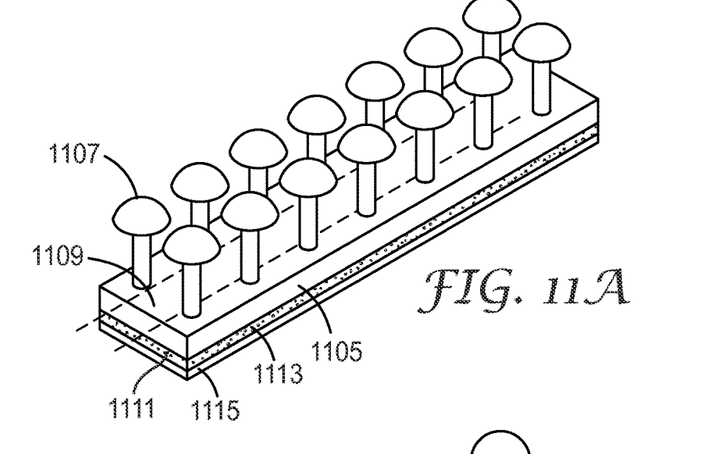
FIGS. 11A and 11B provide perspective views of a track for routing unjacketed drop cable with and without cable in the track.
Figure 11B:
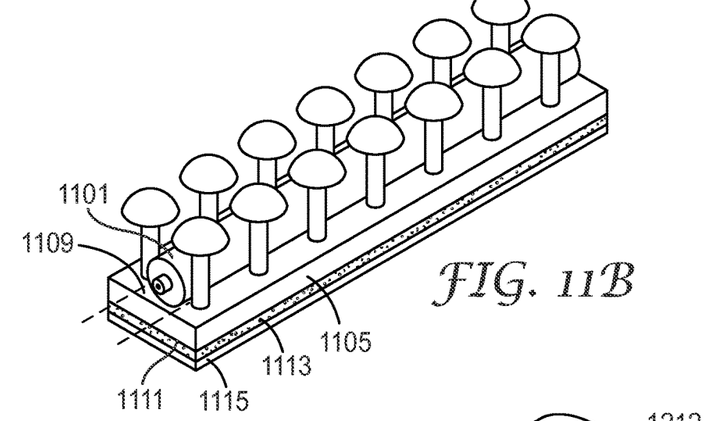

FIGS. 11A and 11B offer perspective views of the track 1105 and features 1107 that are positioned along its length. As shown, in some embodiments, the features 1107 are positioned on opposing sides of the channel 1109. In some embodiments, the features may be intermittently spaced along the length of the track. In one embodiment, the features can be post-like features that may include a widened cap at the top of the features (much like mushrooms), such as those illustrated in FIGS. 11A and 11B, where the cap aids in securing and protecting the unjacketed fiber drop cable in the channel. The unjacketed drop cable 1101 (e.g. buffer coated optical fiber) may be inserted into the channel 1109 using an insertion tool that applies pressure onto the unjacketed portion of the drop cable in the direction of the channel in order to slide it past the any cap or top of the features and secure it in the channel. Such a tool may be similar to that illustrated in FIG. 8.

The surface of the track that is intended for adhesion to the wall, i.e., surface 1111, may be pre-laminated with some sort of adhesive layer 1113, e.g., a pressure sensitive adhesive layer. The adhesive may be a double sided adhesive for sticking to both the track and to the interior wall of a dwelling. The side of the adhesive intended for adhesion to the interior wall may initially be covered with a liner 1115 (shown, but optional), that may be stripped away by the installer at the time of application of the track to the wall. In one embodiment, the adhesive layer 1113 may be a stretch-release adhesive. Any appropriate type of adhesive for use in adhesive layer 1113 is contemplated.

In some embodiments, the track and features will be made up of a flexible material that is either clear or translucent. The flexibility of the track and features enable the track to bend en route to the wall outlet, where, e.g, the track must turn a corner. Additionally, flexibility of the features allows for the unjacketed portion of the drop cable to be snapped into the channel. The clear or translucent nature of the track allows it to be aesthetically pleasing and difficult to notice for tenants or workers in the dwelling. Alternatively, the track and features may be made up of a flexible material that is color-matched to the color of the wall onto which it is being adhered. Similarly, in order to make the unjacketed portion of the drop cable less conspicuous, the buffer coating around the optical fiber routed in the track may be either clear or translucent or may be color-matched to the color of the wall onto which the track is adhered. Color-matching the track or buffered optical fiber may offer similar concealing, aesthetically pleasing properties to the system.

Figure 12:
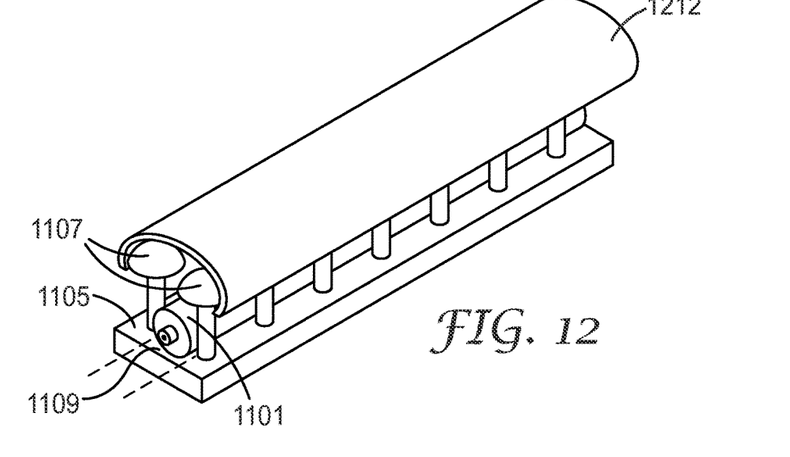
FIG. 12 provides a perspective view of a track for routing unjacketed drop cable with a cover to secure and protect the cable in the track.
Figure 13A:
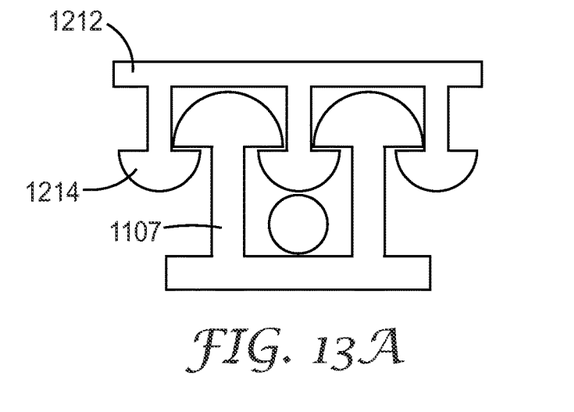
FIGS. 13A-B are cross-sectional views of tracks for routing unjacketed drop cable that contain covers to secure and protect the cable.
Figure 13B:
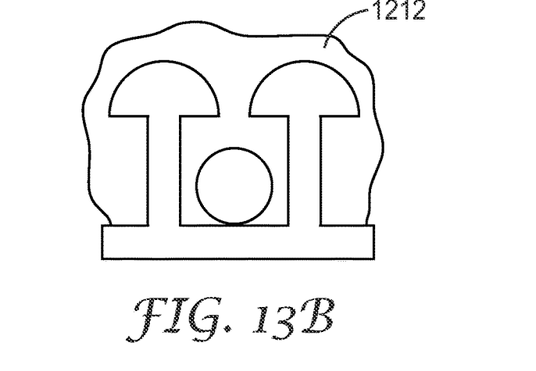
Figure 14:
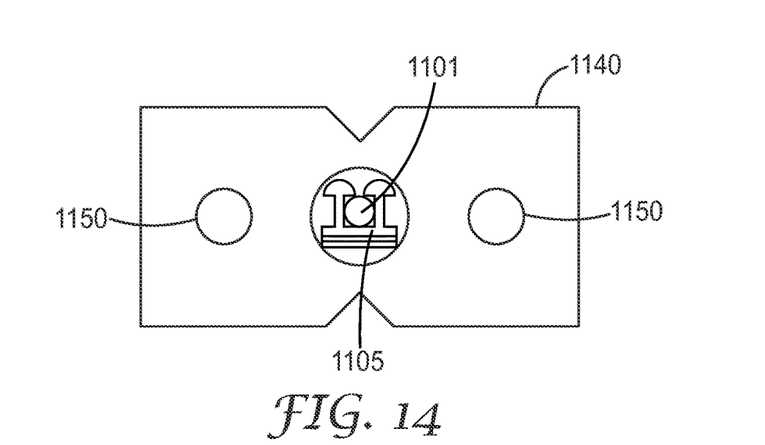
FIG. 14 is a cross-sectional view of a jacketed fiber drop cable pre-populated with a track for routing indoors upon peeling of the jacket.

In some embodiments, the system may further include a cover portion that is positioned over the channel. Such an embodiment may be better understood by reference to FIG. 12. In this embodiment, a cover portion 1212 is positioned over the channel 1105, and potentially secured onto features 1107. The cover portion 1212 provide additional protection for the unjacketed portion of the fiber drop cable 1101. Alternatively, as shown in the cross-sectional views in FIGS. 13A and 13B, the cover portion 1212 may be shaped such that it mates with the shape of the features in the track. For example, the cover portion 1212 may contain its own features 1214 that are negatives of and/or mate with the track features 1107. Alternatively, as illustrated in FIG. 13B, the cover portion 1212 may simply be a material that is coated over the entirety of the track construction, such as a caulking material. While in some embodiments, the unjacketed optical fiber drop cable may be removed from the jacket of the drop cable at the entrance point, and snapped into a track that is provided separately, it is also contemplated that the track may also be pre-populated within the jacket of the drop cable. Such a construction is illustrated in FIG. 14. Here jacket 1140 surrounds a construction in which the unjacketed portion of cable 1101 is already populated in, or snapped into, track 1105, such that the entire construction can be adhered to an interior wall of a dwelling once jacket 1140 is peeled away. As with other proposed constructions, the cable construction may include, e.g., strength members 1150 within the drop cable.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

We claim:

1. A fiber drop cable assembly, comprising:
   an optical fiber;
   an adhesive layer that surrounds the optical fiber, the adhesive suitable for adhering the optical fiber to a wall or other permanent or semi-permanent structure;
   a removable jacket positioned around the adhesive layer and optical fiber, wherein the removable jacket is formed from at least one polymer material selected from the group consisting of polyethylene, polypropylene, polyvinyl chloride, TPE, neoprene, polyurethane, and fluoropolymer, and
   a liner layer positioned over the adhesive layer and within the jacket, wherein the liner layer remains intact after the removal of the jacket and wherein the liner layer may be subsequently separated from the adhesive layer to prepare the adhesive layer for adherence to a surface.

2. The fiber drop cable assembly of claim 1, further comprising a buffer coating positioned between the optical fiber and the adhesive layer.

3. The fiber drop cable assembly of claim 1, further comprising two strength members positioned within the removable jacket on opposite sides of the optical fiber.

4. The fiber drop cable assembly of claim 1, wherein the removable jacket is capable of being peeled by hand.

5. The fiber drop cable assembly of claim 1, further comprising a pull string that is positioned within the jacket and runs generally parallel to the optical fiber, wherein the jacket may be opened by pulling the pull string.

6. The fiber drop cable assembly of claim 1, wherein the adhesive layer comprises one of a pressure sensitive adhesive, a heat activated adhesive, a moisture-curing adhesive, a radiation curing adhesive, and an air cured adhesive.

7. The fiber drop cable assembly of claim 1, wherein the adhesive coated fiber is adhered to a wall, or other permanent or semi-permanent structure and, wherein the assembly further comprises a means to render tack-free the non-adhered portions of the adhesive, the means to render tack-free being chosen from:
   i. a thin particulate layer being placed on and covering the adhesive layer,
   ii. a thin film being placed on and covering the adhesive layer,
   iii. a coating being applied to and covering the adhesive layer,
   iv. a volatile tackifying agent dissolved in the adhesive that evaporates and renders the adhesive tack-free, or
   v. a curing reaction based on light, heat, moisture or air that causes the adhesive to slowly lose tack.

8. The fiber drop cable assembly of claim 1, wherein a jacketed portion of the fiber drop cable assembly is routed exterior to a dwelling, and a peeled portion of the cable assembly is adhered to a surface of the interior of a dwelling.

9. The fiber drop cable assembly of claim 1, wherein the removable jacket is formed from a UV stabilized polymer material.

10. A fiber drop cable assembly, comprising:
    an optical fiber;
    an adhesive layer that surrounds the optical fiber, the adhesive suitable for adhering the optical fiber to a wall or other permanent or semi-permanent structure;
    a removable jacket positioned around the adhesive layer and optical fiber; and
    a liner layer positioned over the adhesive layer and within the jacket, wherein the liner layer remains intact after the removal of the jacket and wherein the liner layer may be subsequently separated from the adhesive layer to prepare the adhesive layer for adherence to a surface.

11. The fiber drop cable assembly of claim 10, further comprising a buffer coating positioned between the optical fiber and the adhesive layer.

12. The fiber drop cable assembly of claim 10, further comprising two strength members positioned within the removable jacket on opposite sides of the optical fiber.

13. The fiber drop cable assembly of claim 10, wherein the removable jacket is capable of being peeled by hand.

14. The fiber drop cable assembly of claim 10, further comprising a pull string that is positioned within the jacket and runs generally parallel to the optical fiber, wherein the jacket may be opened by pulling the pull string.

15. The fiber drop cable assembly of claim 10, wherein the adhesive layer comprises one of a pressure sensitive adhesive, a heat activated adhesive, a moisture-curing adhesive, a radiation curing adhesive, and an air cured adhesive.

16. The fiber drop cable assembly of claim 10, wherein the adhesive coated fiber is adhered to a wall, or other permanent or semi-permanent structure and, wherein the assembly further comprises a means to render tack-free the non-adhered portions of the adhesive, the means to render tack-free being chosen from:
    i. a thin particulate layer being placed on and covering the adhesive layer,
    ii. a thin film being placed on and covering the adhesive layer,
    iii. a coating being applied to and covering the adhesive layer,
    iv. a volatile tackifying agent dissolved in the adhesive that evaporates and renders the adhesive tack-free, or
    v. a curing reaction based on light, heat, moisture or air that causes the adhesive to slowly lose tack.

17. The fiber drop cable assembly of claim 10, wherein a jacketed portion of the fiber drop cable assembly is routed exterior to a dwelling, and a peeled portion of the cable assembly is adhered to a surface of the interior of a dwelling.

* * * * *

UNITED STATES PATENT AND TRADEMARK OFFICE
CERTIFICATE OF CORRECTION

PATENT NO. : 10,018,798 B2
APPLICATION NO. : 14/918014
DATED : July 10, 2018
INVENTOR(S) : Larson et al.

Page 1 of 1

It is certified that error appears in the above-identified patent and that said Letters Patent is hereby corrected as shown below:

On the Title Page

Item (73), Assignee, Line 1-2, delete "3M Innovative Properties Company, St. Paul, MN (US)" and insert -- Corning Research & Development Corporation, Corning NY (US) --, therefor.

Signed and Sealed this
Twenty-fifth Day of August, 2020

Andrei Iancu
*Director of the United States Patent and Trademark Office*